UNITED STATES PATENT OFFICE.

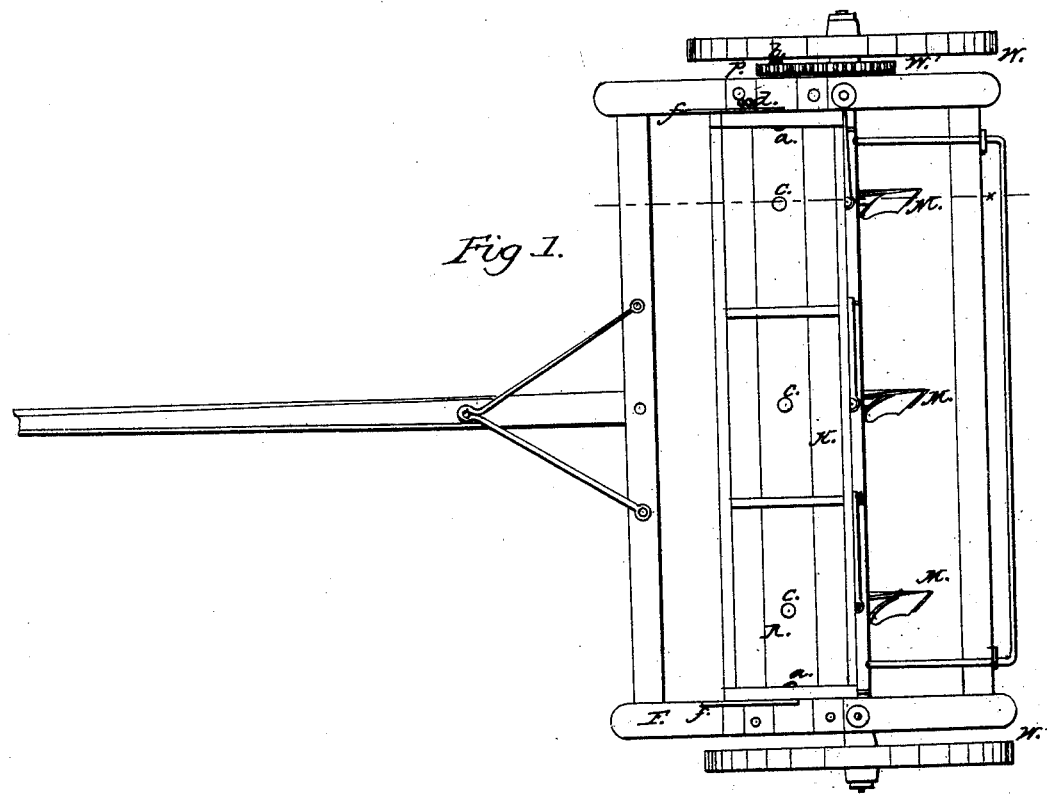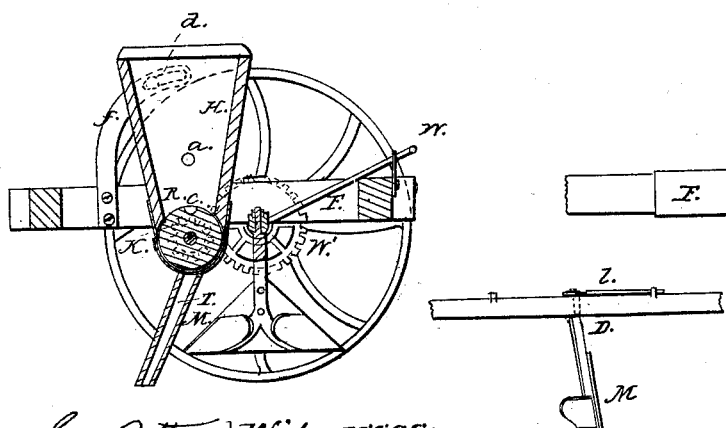

JOHN G. MITCHELL, OF COLLINGTON, MARYLAND.

IMPROVEMENT IN CORN-PLANTERS.

Specification forming part of Letters Patent No. 23,382, dated March 29, 1859.

*To all whom it may concern:*

Be it known that I, JOHN G. MITCHELL, of Collington, in the county of Prince George and State of Maryland, have invented a new and useful Improvement in Corn-Planters; and I do hereby declare that the following is a full, clear, and exact description of the same, reference being had to the annexed drawings, forming part of this specification, in the several figures of which similar characters of reference denote the same part.

Figure 1 is a top view of the machine. Fig. 2 is a side view of the same. Fig. 3 is a vertical section on line $x\ x$.

The nature of my invention consists in suspending the hopper on trunnions so that it may be swung thereon, and thus admit of the placing of pinions of different sizes on the shaft of the seed-roller for varying the distance of dropping, and also for suspending the operation of the machine when desired; also, in connection with the depositing arrangement, providing a peculiar covering apparatus, the details of construction and operation being as follows:

In the drawings, F is the main frame, upon blocks B of which is suspended the hopper H by means of trunnions $a\ a$, so that the hopper may be turned about these supports.

In the lower portion of the hopper is the seed-roller R, provided with the usual cells, $c$, for conveying the seed to the discharge-tubes T. This roller turns on a shaft, $b$, and is moved by the meshing of a pinion, $p$, on the end of said shaft, with the cog-wheel W', attached to the main wheel W.

The distance between the hills of corn will be governed by the size of pinion $p$ on shaft $b$, which by the suspending of the hopper can be readily changed to suit any desired distance, the hopper being moved so as to effect the meshing, and clamped by screw $d$, pressing upon arc $f$, arising from the frame.

When the operation of the machine is to be stopped, the hopper can be swung so as to disengage the wheel and pinion, and clamped in this position until it is desired to recommence planting.

The coverer consists of a double mold-board, M, upon an inclined stock, D, supported by the axle-bar F, a lever, $l$, on the head of the shank passing through the bar, serving to turn the stock.

This machine is designed to be used with land laid off in one direction, the tubes passing through the furrows, and starting from a base-line at each end of the field. The coverers thus pass along the ridge of the furrow and throw the earth in upon the deposited grain. As in laying off the ground the earth is turned over on opposite sides, the adjustment of the cover is necessary.

What I claim, and desire to secure by Letters Patent, is—

The combination of the swinging hopper H, constructed and arranged as described, with the adjustable coverer and dropping-tubes, the whole arranged for joint operation in the manner set forth.

In testimony whereof I have hereunto signed my name before two subscribing witnesses.

JNO. G. MITCHELL.

Witnesses:
  GEO. PATTEN,
  F. S. MYER.